(12) United States Patent
Martin et al.

(10) Patent No.: US 8,081,206 B2
(45) Date of Patent: Dec. 20, 2011

(54) CRITICAL ALIGNMENT OF PARALLAX IMAGES FOR AUTOSTEREOSCOPIC DISPLAY

(75) Inventors: Michael Burgess Martin, Germantown, MD (US); Christopher Alan Mayhew, Oakton, VA (US)

(73) Assignee: Vision III Imaging, Inc., Herndon, VA (US)

( * ) Notice: Subject to any disclaimer, the term of this patent is extended or adjusted under 35 U.S.C. 154(b) by 1426 days.

(21) Appl. No.: 10/536,005

(22) PCT Filed: Nov. 20, 2003

(86) PCT No.: PCT/US03/37203
§ 371 (c)(1),
(2), (4) Date: May 20, 2005

(87) PCT Pub. No.: WO2004/049736
PCT Pub. Date: Jun. 10, 2004

(65) Prior Publication Data
US 2006/0203335 A1    Sep. 14, 2006

Related U.S. Application Data

(60) Provisional application No. 60/427,961, filed on Nov. 21, 2002.

(51) Int. Cl.
*H04N 13/00* (2006.01)

(52) U.S. Cl. ............ 348/42; 382/154; 345/419
(58) Field of Classification Search .......... 348/42; 382/154; 345/419
See application file for complete search history.

(56) References Cited

U.S. PATENT DOCUMENTS

| 4,006,291 | A |  | 2/1977 | Imsand |  |
|---|---|---|---|---|---|
| 4,303,316 | A |  | 12/1981 | McElveen |  |
| 4,429,328 | A |  | 1/1984 | Jones et al. |  |
| 4,815,819 | A |  | 3/1989 | Mayhew et al. |  |
| 5,510,831 | A |  | 4/1996 | Mayhew |  |
| 5,991,551 | A | * | 11/1999 | Bacs et al. | 396/324 |
| 6,191,809 | B1 |  | 2/2001 | Hori et al. |  |
| 6,760,020 | B1 | * | 7/2004 | Uchiyama et al. | 345/419 |
| 2001/0045979 | A1 | * | 11/2001 | Matsumoto et al. | 348/43 |
| 2003/0152264 | A1 | * | 8/2003 | Perkins | 382/154 |
| 2004/0090445 | A1 | * | 5/2004 | Iizuka et al. | 345/679 |

FOREIGN PATENT DOCUMENTS

EP    0 735 512 A2    10/1996

* cited by examiner

*Primary Examiner* — Jay Au Patel
*Assistant Examiner* — James Pontius
(74) *Attorney, Agent, or Firm* — Finnegan, Henderson, Farabow, Garrett & Dunner, L.L.P.

(57) ABSTRACT

A method is provided for generating an autostereoscopic display. The method includes acquiring a first parallax image and at least one other parallax image. At least a portion of the first parallax image may be aligned with a corresponding portion of the at least one other parallax image. Alternating views of the first parallax image and the at least one other parallax image may be displayed.

28 Claims, 4 Drawing Sheets

ALIGNED IMAGES (THREE R-L PAIRS)

SEQUENTIAL PLAYBACK PATTERN

RANDOM PLAYBACK PATTERN

ANOTHER RANDOM PLAYBACK PATTERN

CRITICAL ALIGNMENT OF PARALLAX IMAGES FOR AUTOSTEREOSCOPIC DISPLAY

CROSS REFERENCE TO RELATED APPLICATION

This application is a national phase application based on PCT/US2003/037203, filed Nov. 20, 2003, and claims the benefit of U.S. Provisional Application No. 60/427,961, filed Nov. 21, 2002, the content of both of which is incorporated herein by reference.

FIELD OF THE INVENTION

The present invention relates to the visual arts field and more particularly to autostereoscopic imaging methods for producing two-dimensional images that, upon display, can be perceived to be three-dimensional without the use of special viewing aids.

BACKGROUND

The production of two-dimensional images that can be displayed to provide a three-dimensional illusion has been a long-standing goal in the visual arts field. Methods and apparatus for producing such three-dimensional illusions have to some extent paralleled the increased understanding of the physiology of human depth perception, as well as, developments in image manipulation through analog/digital signal processing and computer imaging software.

Binocular (i.e., stereo) vision requires two eyes that look in the same direction, with overlapping visual fields. Each eye views a scene from a slightly different angle and focuses it onto the retina, a concave surface at the back of the eye lined with nerve cells, or neurons. The two-dimensional retinal images from each eye are transmitted along the optic nerves to the brain's visual cortex, where they are combined, in a process known as stereopsis, to form a perceived three-dimensional model of the scene.

Perception of three-dimensional space depends on various kinds of information in the scene being viewed including monocular cues and binocular cues, for example. Monocular cues include elements such as relative size, linear perspective, interposition, light, and shadow. Binocular cues include retinal disparity, accommodation, convergence, and learned cues (e.g., familiarity with the subject matter). While all these factors may contribute to creating a perception of three-dimensional space in a scene, retinal disparity may provide one of the most important sources of information for creating the three-dimensional perception. Particularly, retinal disparity results in parallax information (i.e., an apparent change in the position, direction of motion, or other visual characteristics of an object caused by different observational positions) being supplied to the brain. Because each eye has a different observational position, each eye can provide a slightly different view of the same scene. The differences between the views represents parallax information that the brain can use to perceive three dimensional aspects of a scene.

Parallax information does not have to be presented to the brain simultaneously. For example, left and right eye depth information can be presented alternately to the left and right eyes, resulting in depth perception as long as the time interval does not exceed 100 msec. The brain can extract parallax information from a three-dimensional scene even when the eyes are alternately covered and uncovered for periods of up to 100 msec each. The brain can also accept and process parallax information presented to both eyes simultaneously if the parallax information is sequenced. For example. two or more views of the same scene taken from different observational viewpoints may be shown to both eyes in a sequence (e.g., each one of the views may be shown to both eyes for a short amount of time before showing the next view in the sequence).

Several three-dimensional image display methods have been proposed and/or implemented. These methods may be divided into two main categories of stereoscopic display methods and autostereoscopic display methods. Stereoscopic techniques including stereoscopes, polarization, anaglyphic, Pulfrich, and shuttering technologies require the viewer to wear a special viewing apparatus such as glasses, for example. Autostereoscopic techniques such as holography, lenticular screens, and parallax barriers produce images with a three-dimensional illusion without the use of special glasses, but these methods generally require the use of a special screen.

Other systems have been proposed, however, that require neither special glasses nor special viewing screens. These systems include autostereoscopic television and motion picture systems that utilize alternately displayed views of a scene recorded by two cameras from different points of view. For example, the devices described in U.S. Pat. No. 4,006,291 to Imsand; U.S. Pat. No. 4,303,316 to McElveen; U.S. Pat. No. 4,429,328 to Jones et al.; and U.S. Pat. No. 4,815,819 to Mayhew et al., all utilize two carefully aligned cameras to record horizontally, vertically, or a combination of horizontally and vertically displaced views of a scene. While these systems deal mainly with techniques of image acquisition for autostereoscopic display using standard screens, the cameras must be carefully matched and aligned to capture appropriate images. Further, once the images from the cameras have been captured, the alignment of the images cannot be readjusted.

In yet another approach, U.S. Pat. No. 5,510,831 issued to Mayhew describes a method of autostereoscopic display of parallax images using a slit scanning technique. In this technique, two cameras are carefully aligned to capture stereoscopic images. These images may be displayed by providing a first image as a background image and overlaying a second image onto the first image in the form of a scanning slit.

While each of these described methods and systems can be used to capture images for three-dimensional image display, there are problems associated with each. For example, many of the methods require the use of at least two carefully aligned cameras to capture images having parallax information. Aligning multiple cameras at a common scene is cumbersome. Not only are there multiple cameras to carry and to position, but proper alignment and color/luminance matching of the cameras can be difficult. Even after alignment, the cameras still may not provide a desired degree of image alignment for later display. Further, many of the prior art methods require special camera or lens mechanisms, video switching equipment, special viewing glasses, and/or special screens to create the three-dimensional illusion. Also, none of these three-dimensional display methods are suitable for use with randomly acquired images or with images extracted from a conventional video image stream (e.g., sequence) or images with parallel views, for example.

The present invention is directed to overcoming one or more of the problems associated with the prior art three-dimensional image display systems and methods.

SUMMARY OF THE INVENTION

A first aspect of the invention includes a method for generating an autostereoscopic display. The method includes acquiring a first parallax image and at least one other parallax image. A portion of the first parallax image may be aligned with a corresponding portion of the at least one other parallax image. Alternating views of the first parallax image and the at least one other parallax image may be displayed.

A second aspect of the invention includes a system for generating a set of aligned parallax images. The system includes a computer and an application running on the computer. The application is configured to display alternating views of two or more parallax images at a desired viewing rate and to manipulate the two or more parallax images such that at least a portion of first one of the parallax images is aligned with at least a portion of a second one of the parallax images.

DETAILED DESCRIPTION

Figure 1:
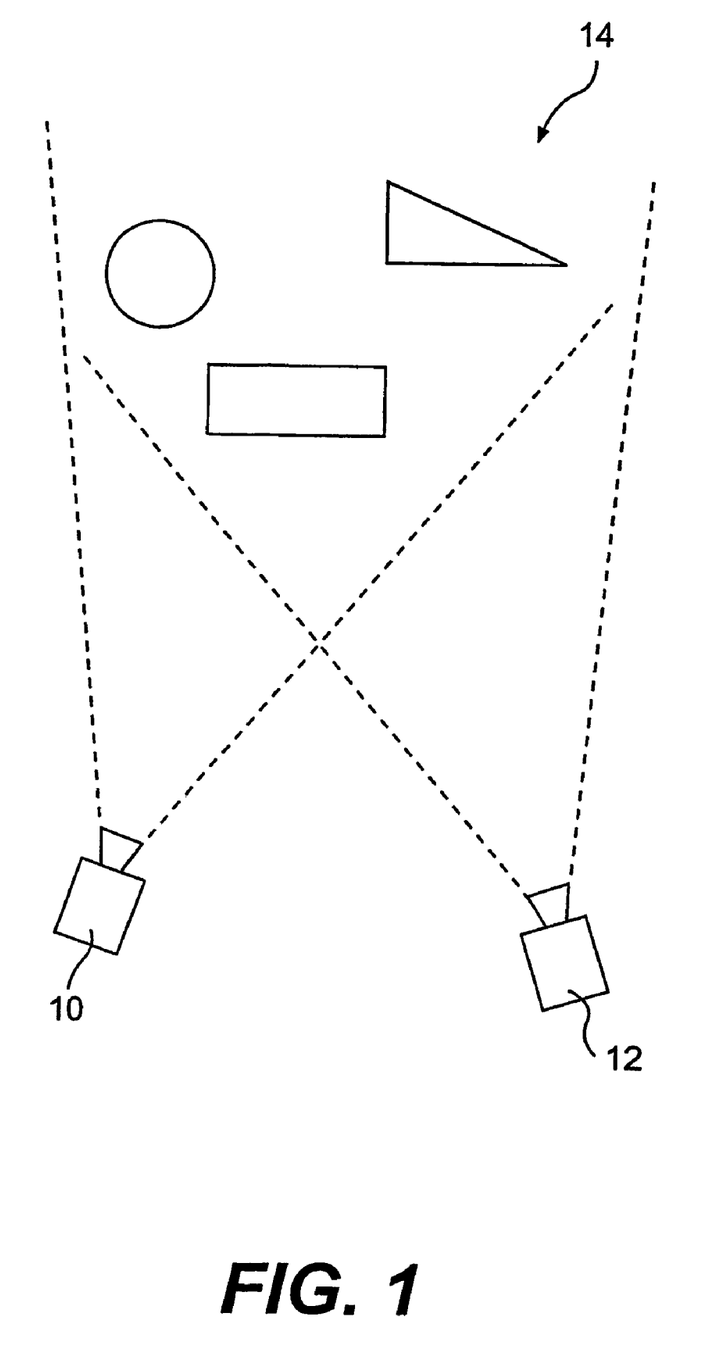
FIG. 1 illustrates exemplary camera positions for generating parallax images in accordance with an exemplary embodiment of the invention.

One exemplary embodiment of the present invention includes a method for creating an autostereoscopic display by manipulating parallax images to create a resultant moving image. The resultant moving image may provide an autostereoscopic display and may be viewed on a conventional screen (e.g., a TV, computer monitor, a projection screen, moving image display, or any other type of display on which a moving image may be shown) As discussed above, parallax images include two or more images with overlapping visual fields but different points of view. For example, as illustrated in FIG. 1, a camera 10 may capture a first set of images and a camera 12 may capture a second set of images of a common scene 14 while being displaced from one another. The resulting sets of images from cameras 10 and 12 will be parallax images. That is, the set of images from camera 10 and the set of images from camera 12 will include some duplicated visual information by virtue of the fact that cameras 10 and 12 capture images of the same scene 14. The sets of images from cameras 10 and 12, however, will also include some different visual information resulting from the different points of view. These parallax images may serve as a basis for generating an autostereoscopic display consistent with the present invention.

It should be noted that cameras 10 and 12 may capture parallax images simultaneously or alternatingly. Parallax images may even be generated by a single camera 10 that captures a first image of scene 14 before moving to a new position (e.g., the position of camera 12 in FIG. 1) and capturing a second image of scene 14. Further, any length of time may pass between capturing parallax images of scene 14. For example, after capturing a first image of scene 14, a second image from a different point of view may be captured at any later time (1 second, 1 hour, 1 day, 1 year, etc.). Additionally, cameras 10 and 12 need not be in any special alignment configuration to produce suitable parallax images for use with the present invention.

Figure 2:
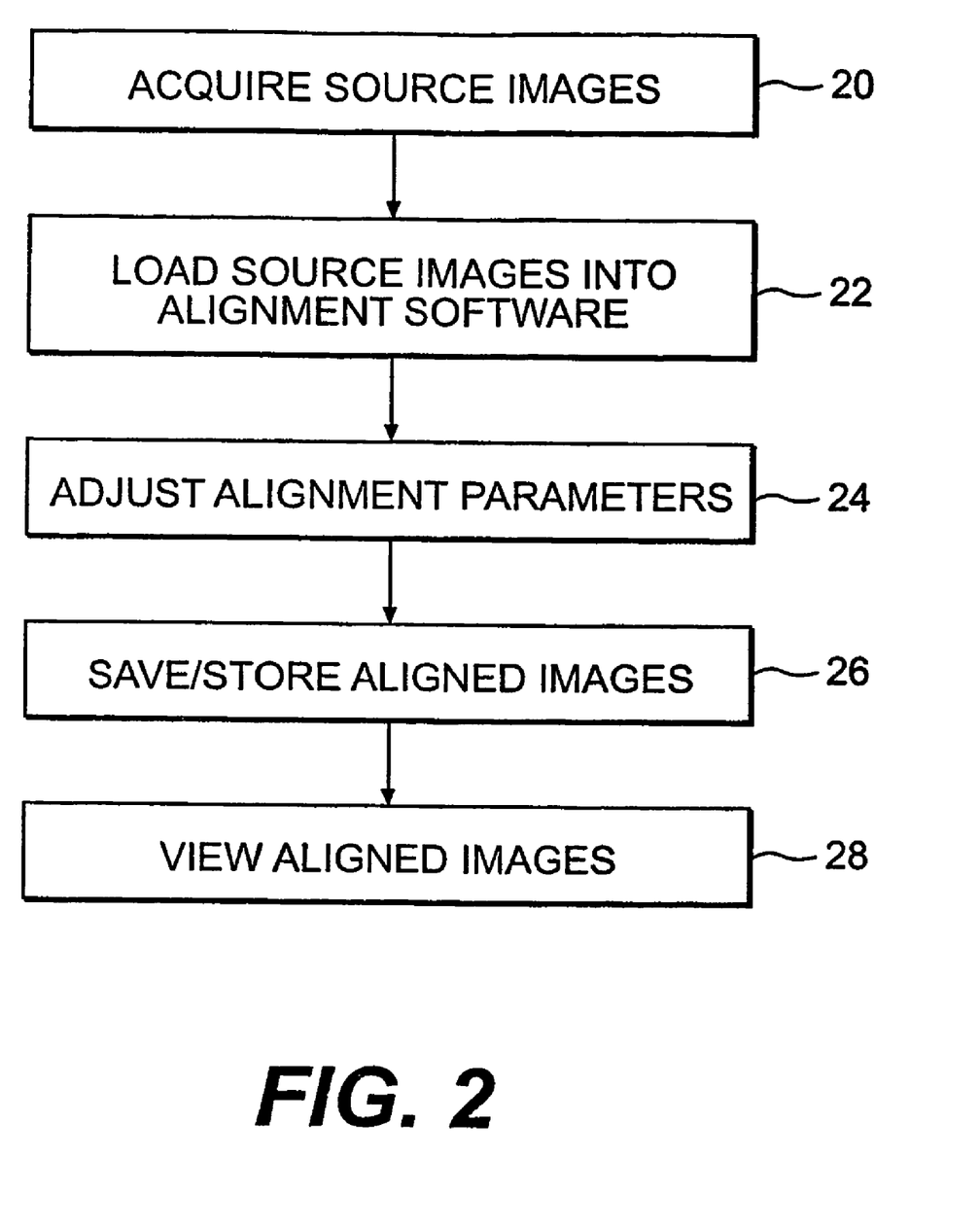
FIG. 2 provides a flowchart representing a method for critically aligning parallax images in accordance with an exemplary embodiment of the invention.

An exemplary method of the present invention may involve the steps of acquisition and selection of source images, critical alignment of the images, and display of the images. In one embodiment, as illustrated in FIG. 2, the method may include acquiring source images at step 20, loading source images into alignment software at step 22, adjusting alignment parameters at step 24, saving/storing aligned images at step 26, and viewing aligned images at step 28.

Acquisition and Selection

The parallax images used to generate the autostereoscopic display may be acquired from a variety of imaging sources such as digital still cameras, digital video cameras, conventional film cameras and conventional video cameras (followed by subsequent digitization), computer generated graphics sources, and any other suitable imaging source. Additionally, the parallax images may be taken from a single image stream or from multiple image streams. Multiple image streams could be the output of a video stereo camera pair, or more generally, any two or more image sources with overlapping views of the same scene, including overlapping image sequences with parallel points of view. The parallax images may also be generated by a computer (as with 3D rendered graphics) or false-color images produced by RADAR, SONAR, etc.

Critical Alignment

The alignment process includes displaying alternating views of parallax images, at a desired viewing rate (i.e., a frequency at which the parallax image views are changed), and then manipulating the alternating views to match alignment. While the alternating views may be displayed at any desired viewing rate, in one embodiment, the viewing rate may be from about 3 Hz to about 6 Hz. The term "match alignment" refers to a condition in which a region of interest in an image to be aligned (i.e., converged) is positioned such that it occupies the same location within the frame of the image to be aligned as the corresponding region in a reference image frame. The region of interest may be all or part of the image to be aligned.

Figure 3A:
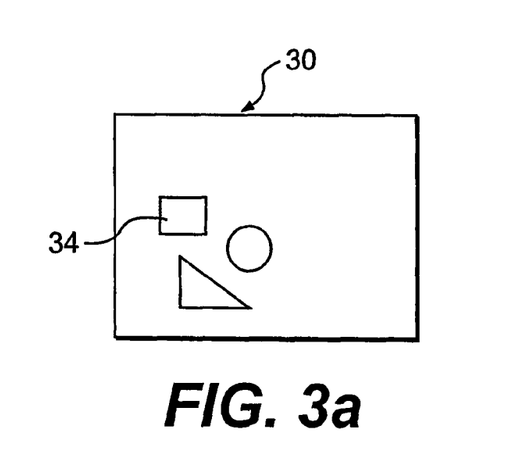
FIGS. 3a-3d illustrate a transformation process for aligning parallax images in accordance with an exemplary embodiment of the invention.
Figure 3B:
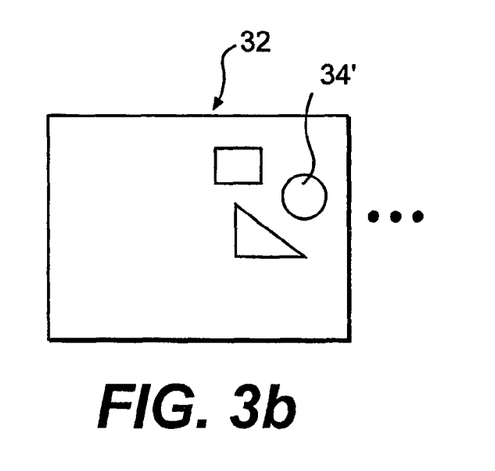

The alignment matching process begins by selecting a reference image 30, as shown in FIG. 3a, from a set of parallax images. Once reference image 30 has been selected, other images 32, as shown in FIG. 3b, from the parallax image set can be aligned to reference image 30. While only a single unaligned image 32 is shown in FIG. 3b, unaligned image 32 may represent a plurality of N images. One or more of the plurality of N images may be selected and aligned with respect to reference image 30. In certain situations, the stability of an autostereoscopic display consistent with the present invention may increase as the number of parallax images with differing parallax positions increases.

Figure 3C:
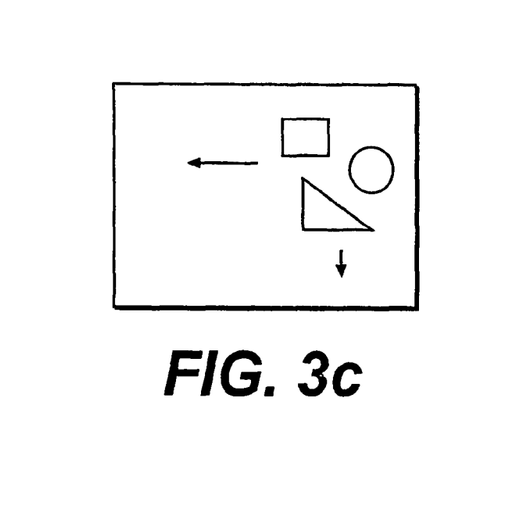
Figure 3D:
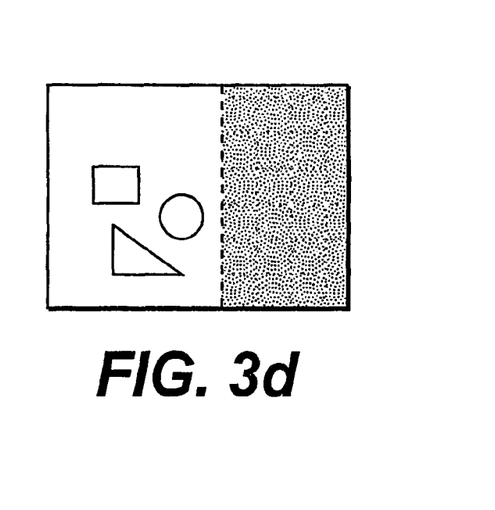

Reference image 30 may include a region of interest 34. The same region of interest 34', albeit as viewed from a different point of view, may appear in unaligned image 32. Unaligned image 32 may be manipulated, as shown in FIG. 3c, for example, until region 34' matches alignment with region 34, as illustrated in FIG. 3d. The manipulation process may be represented by an affine transformation including translation, rotation, scaling, and/or any other desired transformation. In addition, the point about which unaligned image 32 is rotated can also be adjusted to a position other than the center of the image.

The critical alignment process may be performed by a computer. For example, a set of parallax images may be loaded into a software application that enables a user to select a reference image. For example the set of parallax images may be loaded into open graphics language (OGL) software or other software suitable for manipulating image data. The computer may then automatically perform alignment of one or more of the remaining parallax images in the set. Alternatively, however, the software may enable an operator to input transformation parameters for one or more of the remaining parallax images in the set.

In one exemplary embodiment, a user may select a convergence point in the reference image and in one or more of the unaligned images. A computer can perform appropriate translation(s) to align the convergence points in the images based on calculated differences between the selected convergence points in the images. The computer may further perform pattern matching or feature extraction algorithms to determine, (a) whether any significant rotational disparities exist among two or more selected images, (b) the degree of the rotational disparities, (c) a point or rotation about which one or more of the selected images can be rotated, and (d) what rotational translation(s) would be required to match alignment of regions of interest in the selected images at or near the selected convergence points. Thus, the computer may align the images based on the convergence points selected and rotate the images to match alignment.

In another embodiment, the computer may control an even greater portion of the alignment process. For example, either an operator or the computer may select a convergence point in reference image 30. Next, the computer may use pattern-matching algorithms to compute an estimate for a matching region in unaligned image 32 that corresponds to the region around the convergence point in reference image 30. Any appropriate pattern matching algorithm known in the art may be used to perform this calculation.

For example, a block of pixels from each of images 30 and 32 may be chosen and compared for similarity. This process may be repeated until a best match is chosen. Repetition of this process with increasingly smaller displacements may be performed to refine the translation value (e.g., to provide transformation parameters of sub-pixel resolution). Rotation may also be handled, as described above.

In yet another embodiment, the computer may enable an operator to input transformation parameters for one or more parallax images. Thus, for each image to be aligned, a user may manually enter and vary transformation parameters to align the parallax images. The alignment software may include, for example, a graphical user interface (GUI) where the user may enter transformation parameters such as translation parameters, scaling parameters, rotation values, a rotational pivot point, and any other parameters associated with image transformations. Additional features may include alignment guides to assist in qualitatively identifying matching areas, the ability to zoom in/out, and the ability to mask off (i.e., obscure) parts of an image outside the region of interest.

Regardless of the degree of automation, the transformation parameters in each process may be continuously adjusted until critical alignment is achieved. Critical alignment corresponds to a condition where the degree of alignment is sufficient to achieve a stable autostereoscopic display. Stability of the whole image may not be required, as long as at least a particular region of interest in the autostereoscopic display is stable.

One of the key elements of the disclosed alignment process is the use of parallax image manipulations of sub-pixel resolution to achieve critical alignment. Specifically, the transformations for achieving critical alignment may proceed to a sub-pixel level where one image is moved with respect to another image by an amount less than an integral number of pixels. That is, the transformations may include displacements of an integral number of pixels plus or minus any fraction of one pixel dimension. These sub-pixel manipulations may help to maximize the stability of the autostereoscopic display. To achieve sub-pixel alignment, image interpolation methods such as bicubic resealing, bilinear resealing, or any other appropriate image interpolation method may be employed.

Display

The parallax images, and alternating views thereof, may be displayed before, during, or after critical alignment of the parallax images. Displaying alternating views of the parallax images during the critical alignment process may aid in determining when one or more images match alignment with a reference image. For example, as the alternating views of the parallax images are displayed, a user may intermittently enter transformation parameters, as described above, to align two or more parallax images. One advantage of displaying the parallax images during the alignment process is that the user may see, in real time, the effect that the entered transformation parameters have on the alignment of the images. In this way, a user may progress incrementally toward a match alignment condition by entering transformation parameters, observing the alignment condition of the parallax images, and reentering transformation parameters to refine the alignment condition of the parallax images.

Once the parallax images have been aligned, the aligned images may be stored as a set of image data. Storing image data in this manner may be useful for displaying the aligned parallax images in a stand-alone operation after alignment has been completed. For example, the aligned parallax images may be stored and later displayed in a video format. Further, the stored, aligned parallax images may be reloaded into the alignment software for viewing or further processing, including, for example, aligning the images with respect to a new region of interest.

Alternatively, a record of the transformations used to align the images (i.e., image alignment parameters) may be stored. In a later process, the stored transformations may be retrieved and reapplied to the set of parallax images to regenerate the match alignment condition of the images. In one embodiment, the image alignment parameters may be stored and used to align higher resolution versions of the same images. This process may be useful, for example, to speed processing of high resolution images. Rather than performing the critical alignment process on high resolution images, which may require significant processing resources and may slow or prevent real-time manipulation of the images, the manipulations may be performed on low resolution versions of the high resolution images. Then the alignment parameters determined for the low resolution images may be applied to the higher resolution versions of the images.

Figure 4A:
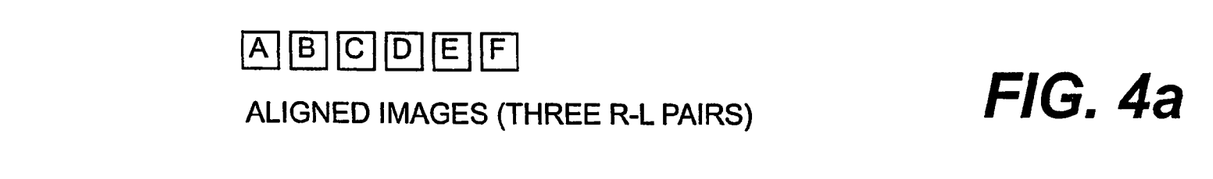
FIGS. 4a-4d illustrate various sequence patterns for display of parallax images during and after alignment in accordance with an exemplary embodiment of the invention.
Figure 4B:
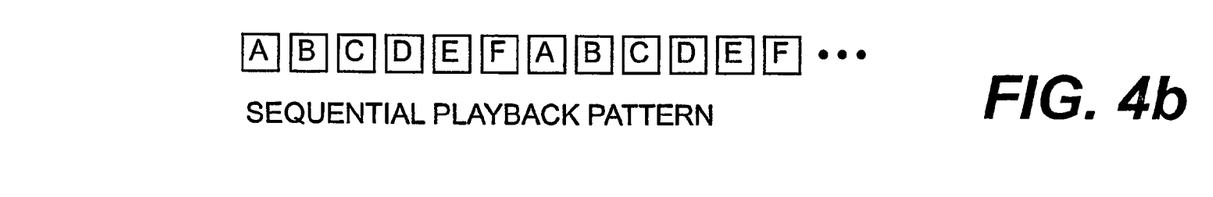
Figure 4C:
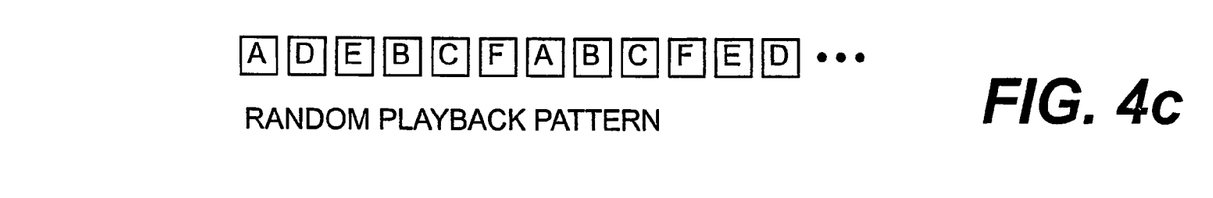
Figure 4D:
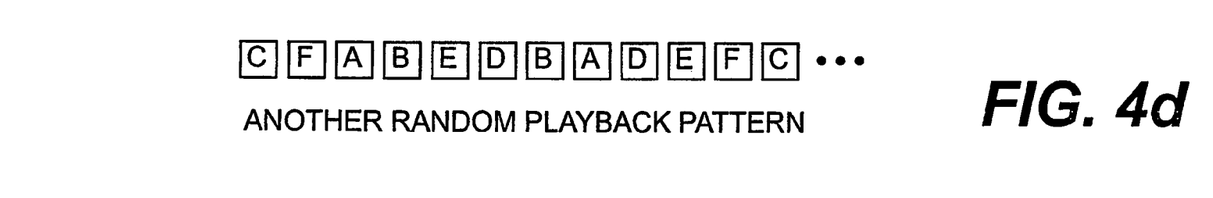

Unlike stereoscopic displays, the autostereoscopic images consistent with the invention can be viewed as a sequence of images on conventional two-dimensional displays (e.g., screens), such as a television, computer monitor, a projection screen, moving image display, or any other type of display on which a moving image may be displayed. A set of aligned images can be displayed in sequential order, a randomly selected order, or any other desired order. For example, FIG. 4a represents a set of six parallax images (e.g., three right-left pairs) in matched alignment. FIG. 4b illustrates a sequential playback pattern in which the aligned parallax images in the set are displayed serially in a repeating sequence. FIGS. 4c and 4d demonstrate two possible random playback sequences. As noted above, the frequency with which the views in the sequence are changed (i.e., the viewing rate) may be any desired frequency. In one embodiment, however, the viewing rate may be between about 3 Hz and about 6 Hz. Furthermore, the viewing rate need not be constant, but may be varied over time.

Analysis:

In addition to or instead of displaying the aligned parallax images, computational analysis may be performed on the images. For example, certain quantitative information may be extracted from the aligned parallax images. As a result of the parallax information contained in the images, an apparent shift of an object may exist between different views. The apparent shift refers to the distance a point in an image appears to move between images taken from different points of view. By measuring the amount of apparent shift of a point in two or more parallax images, quantitative position values may be computed for the point in relation to objects in the image if certain other information, such as the distance between the camera and a point in the image, is known. For example, by knowing the distance between the camera and the ground in an image captured from the air, and by measuring the apparent shift of the top edge of a building between two or more parallax images, the height and/or volume of the building may be calculated.

Additionally, quantitative positional information for scene points may be calculated based on known quantities appearing in the image. For example, if a certain model of automobile appears in the image and dimensional data is available for that automobile, then positional values may be calculated for other scene points by measuring the apparent shift of one or more points in the scene associated with the automobile.

Further, by determining position values for enough scene points in an image, a depth map for objects in the scene can be computed.) This depth map can be used to create views corresponding to intermediate parallax angles. This allows for interpolation of views from the originally captured images.

The invention claimed is:

1. A method of generating an autostereoscopic display, including:
    acquiring a first image of a first visual field and at least one second image of a second visual field that at least partially overlaps the first visual field, wherein differences between the first image and the second image include parallax information;
    alternately displaying, by a processor associated with a computer, the first image and the second image on a display;
    while displaying the images, aligning a user-selected region of interest associated with the first image with a corresponding region of interest of the second image such that said region of interest of the first image occupies in the display the same location as the region of interest in the second image.

2. The method of claim 1, wherein the step of aligning includes at least one of translation, rotation, and scaling.

3. The method of claim 2, wherein the step of aligning is performed with sub-pixel resolution.

4. The method of claim 1, further comprising storing alignment parameters associated with at least one of the first image and the second image, and applying the alignment parameters to the at least one of the first image and the second image.

5. The method of claim 1, wherein the display includes at least one of a computer monitor, a television, a projection screen, and a moving image display.

6. The method of claim 1, wherein the first image and the second image were captured by two different cameras viewing the first visual field.

7. The method of claim 1, wherein the first image comprises a first frame of a video image stream captured by a video camera and the second image comprises at least one frame of the video image stream captured by the video camera, wherein the at least one frame is time-delayed from the first frame.

8. The method of claim 1, wherein the first image and the second image were captured using a single camera whose position was moved between capturing the first image and the second image.

9. The method of claim 1, wherein the first image and the second image were generated by a computer.

10. The method of claim 1, wherein displaying alternating views of the first image and the second image comprises displaying alternating views of the first image and the second image at a predetermined viewing rate.

11. A system for generating a set of aligned parallax images, comprising:
    a computer having a computer-readable medium for use on a computer system, the computer-readable medium having a computer-executable application that is configured to cause the computer to display alternating views of at least first and second parallax images acquired by an image recording device at a desired viewing rate and while displaying the images, to align a user-selected region of interest associated with the first image with a corresponding region of interest of the second image such that said region of interest of the first image occupies in the display the same location as the region of interest in the second image.

12. The system of claim 11, wherein the application is further configured to cause the computer to apply a set of transformations to at least one of the first and second parallax images.

13. The system of claim 11, wherein the one or more transformations includes at least one of translation, rotation, and scaling.

14. The system of claim 11, wherein the application is further configured to cause the computer to accept an input from an operator designating one of the first and second parallax images as a reference image and to accept transformation parameters from the operator that affect the transformation of the first and second parallax images.

15. The system of claim 11, wherein the application is further configured to cause the computer to accept inputs from an operator identifying convergence points in the first and second parallax images and to calculate transformation parameters for performing the transformation of the first and second parallax images.

16. The system of claim 11, wherein the application is further configured to cause the computer to perform pattern matching to determine whether any significant rotational disparities exist between the first and second parallax images, a degree of the rotational disparities, a point of rotation, and rotational translations needed to correct for the rotational disparities.

17. The system of claim 11, wherein the application is further configured to cause the computer to measure an amount of apparent shift associated with a point appearing in each of the first and second parallax images and to calculate a quantitative position value for the point.

18. The system of claim 11, wherein the application is further configured to cause the computer to compute a depth map for objects appearing in the first and second parallax images.

19. The system of claim 11, wherein the desired viewing rate is between about 3 Hz and about 6 Hz.

20. A method of generating an autostereoscopic display, including:

capturing a first image at a first point of view with an image capture device;

using the image capture device to capture at least one second image from a second point of view different from the first point of view;

displaying alternating views of the first image and the second image at a desired viewing rate on a display; and while displaying the images, aligning a user-selected region of interest associated with the first image with a corresponding region of interest of the second image such that said region of interest of the first image occupies in the display the same location as the region of interest in the second image.

21. The method of claim 20, wherein the image capture device is a video camera.

22. The method of claim 20, wherein the desired viewing rate is between about 3 Hz and about 6 Hz.

23. The method of claim 20, further comprising storing the aligned first and second images and replaying alternating views of the aligned images in a video format.

24. The method of claim 20, further comprising storing alignment parameters associated with the first and second aligned images, and applying the alignment parameters to related versions of the first and second images.

25. The method of claim 10, wherein the predetermined viewing rate is between about 3 Hz and about 6 Hz.

26. A method of generating an autostereoscopic display, including:

acquiring, by an image recording device, a first image of a first visual field and at least one second image of a second visual field that at least partially overlaps the first visual field, wherein differences between the first image and the second image include parallax information; and alternately displaying on a display, by a processor associated with a computer, one after the other the first image and the second image while performing one or more transformations on at least one of the first image and the second image to bring a user-selected corresponding region of interest associated with the first image into critical alignment on said display with a corresponding region of the second image as the first and second images are displayed.

27. A method of generating an autostereoscopic display, including:

acquiring, by an image recording device, a first image of a first visual field and at least one second image of a second visual field that at least partially overlaps the first visual field, wherein differences between the first image and the second image include parallax information; and alternately displaying, by a processor associated with a computer, one after the other the first image and the second image on a standard display without requiring the use of specialized eyewear or an autostereoscopic display screen, while performing one or more transformations on at least one of the first image and the second image to bring a user-selected corresponding region of interest associated with the first image and the second image into critical alignment such that the parallax information is discernable by a user.

28. A method of generating an autostereoscopic display, including:

acquiring, by an image recording device, a first image of a first visual field and at least one second image of a second visual field that at least partially overlaps the first visual field, wherein differences between the first image and the second image include parallax information;

generating one or more critically-aligned images by alternately displaying, by a processor associated with a computer, the first image and the second image on a display one after the other while performing one or more transformations on at least one of the first image and the second image to bring a user-selected corresponding region of interest associated with the first image and the second image into critical alignment on the display; and storing the one or more critically-aligned images in a storage medium.

* * * * *

UNITED STATES PATENT AND TRADEMARK OFFICE
CERTIFICATE OF CORRECTION

PATENT NO. : 8,081,206 B2
APPLICATION NO. : 10/536005
DATED : December 20, 2011
INVENTOR(S) : Mayhew et al.

It is certified that error appears in the above-identified patent and that said Letters Patent is hereby corrected as shown below:

Title page, item 12, line 2, should read "Mayhew et al."

Title page, item 75, line 1-3, first named inventor should read Christopher Alan Mayhew; second named inventor should read Michael Burgess Martin.

Signed and Sealed this
Twenty-eighth Day of February, 2012

David J. Kappos
*Director of the United States Patent and Trademark Office*